United States Patent [19]

Ewen et al.

[11] Patent Number: 4,806,181

[45] Date of Patent: Feb. 21, 1989

[54] METHOD FOR MOULDING A THERMOPLASTICS MEMBER WITH A FUSION PAD

[75] Inventors: Alexander T. E. Ewen, Nazing; David A. Hewitt, Welwyn Garden City, both of Great Britain

[73] Assignee: Glynwed Tubes & Fittings Limited, Great Britain

[21] Appl. No.: 21,446

[22] Filed: Mar. 4, 1987

[30] Foreign Application Priority Data

Mar. 19, 1986 [GB] United Kingdom ............... 8606790

[51] Int. Cl.$^4$ .............................................. B29C 65/02
[52] U.S. Cl. ..................................... 156/64; 156/245; 156/274.2; 156/308.2; 156/309.6; 264/27; 264/263; 264/275; 264/296
[58] Field of Search ................... 285/21; 264/25, 27, 264/263, 272.15, 275, 265, 248, 250, 266, 296, 294; 219/544, 535; 156/47, 48, 64, 51, 138, 140, 143, 144, 242, 245, 272.4, 273.9, 274.2, 274.4, 294, 304.2, 359, 308.2, 309.6

[56] References Cited

U.S. PATENT DOCUMENTS

| | | | |
|---|---|---|---|
| 3,183,361 | 5/1965 | Bronson | 156/272.4 |
| 3,943,334 | 3/1976 | Sturm | 285/21 |
| 4,436,987 | 3/1984 | Thalmann | 156/304.2 |
| 4,455,482 | 6/1984 | Grandclèment | 156/274.2 |
| 4,684,428 | 8/1987 | Ewen | 285/21 |

Primary Examiner—Merrell C. Cashion, Jr.
Attorney, Agent, or Firm—McCormick, Paulding & Huber

[57] ABSTRACT

A method and apparatus for moulding an assembly of a thermoplastics member with a fusion pad 2b such as a pipe tapping tee saddle or a pipe coupling. The fusion pad 2b has an element which is to be electrically heated to weld the assembly to a compatible thermoplastics material and this pad is mounted in the cavity 105, 106 of an injection moulding tool 100 by which the thermoplastics member is to be moulded over the fusion pad 2b. During this latter moulding a control system 111 electrically heats the element to assist in bonding the thermoplastics envelope of the fusion pad to the thermoplastics of the member which is being moulded. A wall part 103 of the moulding tool 100 on which the fusion pad 2b is mounted may be temperature controlled 122 to maintain the surface of the fusion pad in contact therewith substantially solid.

10 Claims, 5 Drawing Sheets

METHOD FOR MOULDING A THERMOPLASTICS MEMBER WITH A FUSION PAD

TECHNICAL FIELD AND BACKGROUND ART

The present invention relates to a method of and apparatus for moulding an assembly of a thermoplastics member with a fusion pad, the latter being intended for the purpose of welding the assembly to a surface of compatible thermoplastics material. More particularly, the invention concerns a thermoplastics member in which the fusion pad comprises an element which is intended to be electrically heated to effect the aforementioned welding. Typical examples of assemblies having thermoplastics members with fusion pads are to be found for the jointing or tapping of thermoplastics piping; in a pipe joint or coupling the thermoplastics member may comprise a socket within which a tubular fusion pad is disposed to effect the welding between the socket and a pipe received therein. For a pipe tapping, the thermoplastics member may be in the form of a tapping saddle for connecting two pipes together at an angle to one another with one pipe communicating through the wall of the other pipe. A tapping saddle is particularly useful for connecting together pipes intended to carry a liquid or gas such as for example pipes forming part of a gas or water main system. FIGS. 1 and 2 of the accompanying illustrative drawings show a known form of tapping saddle in which FIG. 1 is a perspective view from below of the tapping saddle, and FIG. 2 is a perspective view from above of the tapping saddle connected to a pipe. In those Figures the tapping saddle has a saddle pad 2 of thermoplastics for connection to a main pipe 4, a tubular body 6 leading from the pad 2, and a branch pipe 7 leading from the body 6 for connection to a pipe 8. In the case of a gas or water main, the pipe 4 is the main pipe and the pipe 8 leads to a consumer point such as for example a house.

It will be appreciated that the pad 2 and the corresponding region of the wall of the pipe 4 have to be heated in order that they may be fused together; for this purpose a fusion pad part 2a having an electrical heating coil is located in the saddle pad 2. This can be achieved by winding a plastics coated wire into a flat spiral, heat sealing this spiral into a single piece that can be curved to the required pipe diameter, and fixing terminals to the two ends of the heat sealed spiral. This spiral, complete with the terminals, is curved to the required pipe diameter before spiral and terminals are loaded into an injection moulding tool for encapsulation in thermoplastics to form the saddle pad 2 and body 6. The plastics coating which encapsulates the wire spiral is used to maintain the correct wire spacing between adjacent ends of the spiral, and also the optimum spacing between the coil and the pipe 4 during welding.

Our G.B. Patent Specification 2,158,007A discloses a method of producing a fusion pad comprising forming in one surface of a thermoplastics sheet a continuous groove extending between an inner end and an outer end, locating in the groove and electrically conductive wire having a diameter less than the depth of the groove, and melting the upper portion of the groove to envelope and retain the wire in the sheet. The two ends of the wire are connected to respective terminals which project from the sheet. This fusion pad is then bent into a required curvature (such as a saddle) and is placed in a suitable tool to mould a tapping saddle which includes the fusion pad. Experience has indicated that although the fusion pad is attached to the tapping saddle assembly, there is not always a completely homogeneous interface and sometimes it may be possible to prise the fusion pad from the tapping saddle assembly.

In use the known tapping saddle (including the fusion pad) is fused to the pipe 4 by passing current through the wire in the pad. In order to make this connection it has been found necessary to pass a comparatively long burst of current through the wire. This is because the wire has to heat both the pipe and also the part of the pad behind the wire in order to complete the bond of the pad to the tapping saddle. It has been found that this comparatively long duration current can produce sufficient heat to cause the edges of the saddle pad to lift off the pipe 4 thereby reducing the efficiency of the bond.

It is an aim of the invention to alleviate the aforementioned disadvantages.

STATEMENT OF INVENTION AND ADVANTAGES

According to the present invention there is provided a method of moulding an assembly of a thermoplastics member with a fusion pad, said pad comprising an element which is to be electrically heated for the purpose of welding the assembly to a surface of compatible thermoplastics material, and which comprises locating the element in an envelope of thermoplastics material to provide the fusion pad; mounting the fusion pad in a plastics moulding machine; moulding the thermoplastics member over the fusion pad and, during the moulding of the thermoplastics member electrically heating the element to assist in bonding the thermoplastics material of the envelope to the material of the member.

Further according to the present invention there is provided apparatus for moulding an assembly of a thermoplastics member with a fusion pad which comprises a plastics injection moulding machine having a moulding tool with a cavity substantially corresponding to the shape of the assembly which is to be formed; means for mounting in the cavity a fusion pad comprising a thermoplastics envelope and an element which is to be electrically heated located in said envelope; electrical connection means for coupling with the element of a fusion pad mounted in the cavity whereby that pad can be electrically heated, and means controlling electrical heating of the element during moulding of the thermoplastics member to assist in bonding the thermoplastics material of the envelope to that of the member which is moulded in the cavity.

The assembly can be of any structure which is intended to be electrically welded to a thermoplastics surface. However the invention will have particular advantage for pipe couplings such as in socket and spigot joints or in pipe tapping saddles or connections as previously mentioned. Having in mind the aforegoing it will be appreciated that the fusion pad comprising the wire element and thermoplastics envelope can be of many forms, such as a sleeve or tube for moulding into a socket for a pipe coupling or a flat or curved disc for moulding into a tapping saddle as proposed in G.B. 2,158,007A By the present invention it has been found possible to control the characteristics of moulding the thermoplastics member with the electrical heating of the fusion pad so that the thermoplastics envelope of the fusion pad is molten, or substantially so, at its interface with the material (which will usually be injected) for moulding the member and thereby for an efficient bond to be achieved between the two compatible plastics.

Preferably the fusion pad is mounted in the cavity of the moulding machine tool so that a surface part of the envelope (which surface part corresponds to that part of the fusion pad which is to be welded to a compatible thermoplastics surface) communicates (preferably in face-to-face contact) with a wall part of the machine. This wall part of the moulding machine can be temperature controlled, for example by electrical heating means and/or fluid heat exchangers, to provide desired moulding conditions for the fusion pad to be bonded to the injected thermoplastics. Preferably the aforementioned wall part of the tool is temperature controlled to maintain the surface part of the envelope with which it communicates substantially solid. With the latter feature in mind the element in the fusion pad may be electrically heated and the moulding conditions controlled to provide a temperature gradient through the material of the envelope so that the surface of the envelope may be molten to bond to the material which is being moulded to form the member. By providing a temperature gradient in the envelope between relatively solid and molten zones, it is possible to ensure that the heating element is located in a zone which is sufficiently solid to alleviate disturbance of the element during the moulding process.

With a typical thermoplastics material (such as polyethylene) for the member and envelope, the moulding of the member, such as a tapping saddle or pipe coupling, is likely to be carried out in the range of 200° C. to 250° C. (although the thermoplastics will usually melt at temperatures above 130°). It is therefore preferred that the aforementioned wall part of the moulding tool is temperature controlled to be less than 130° to provide a required temperature gradient in the envelope as aforementioned.

The present invention is not limited to any particular amplitude and time duration of current for heating the element, but particularly good results have been obtained when heating a wire element for approximately forty five to sixty seconds with a current of approximately five amps.

The invention also includes an assembly which is moulded by the method specified as being in accordance with the invention.

FIGURES IN THE DRAWINGS

One embodiment of the invention for an assembly in the form of a pipe tapping saddle will now be described, by way of example, with reference to the accompanying drawings, in which.

DETAILED DESCRIPTION OF THE DRAWINGS

Figure 5:
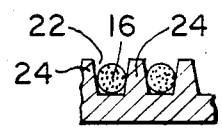
FIG. 5 is an enlarged sectional side view of the groove of the envelope material in the fusion pad of FIG. 3.
Figure 6:
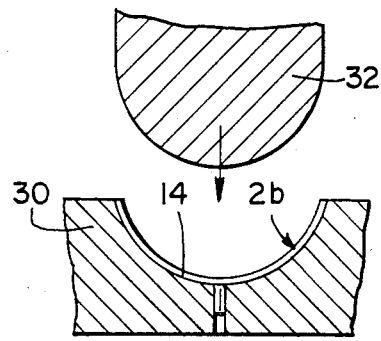
FIG. 6 is a sectional side view of a punch for curving the fusion pad shown in FIG. 3.
Figure 3:
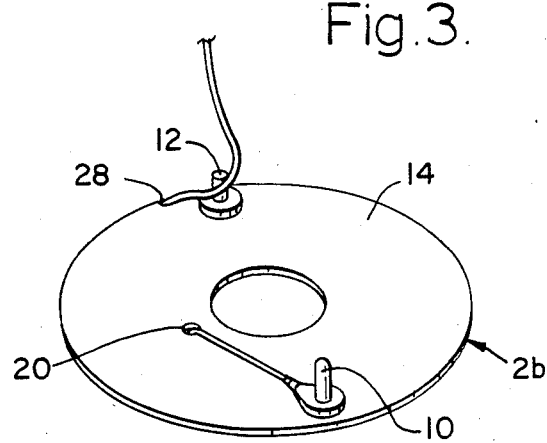
FIG. 3 is an underside perspective view of a partly formed fusion pad which is to be moulded into the tapping saddle.
Figure 4:
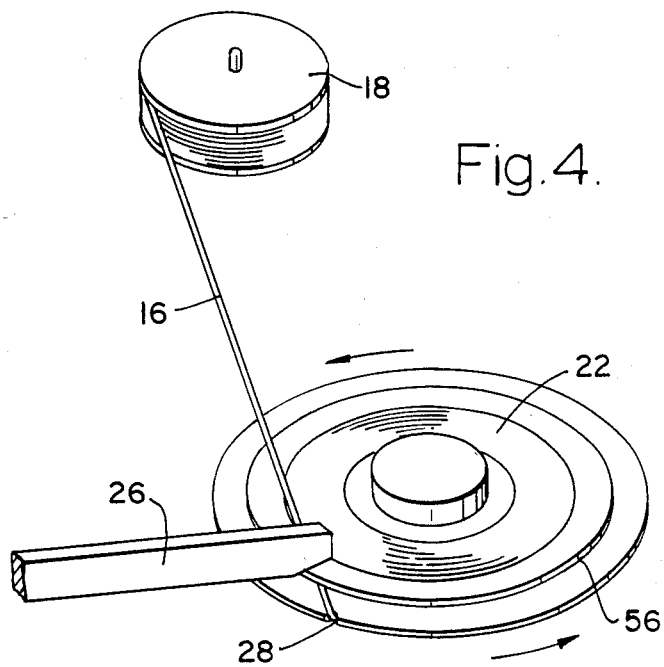
FIG. 4 is an upper perspective view showing the formation of the fusion pad in FIG. 3 with an electric heating wire being located in a groove of the envelope material.

Referring to FIGS. 3 and 4 two terminals 10 and 12 project from the underside of a fusion pad 2b (shown partly formed in FIGS. 3 and 4) comprising an annular sheet of thermoplastics enveloping material 14 and an electrically conductive wire 16. The wire 16 is fed from a reel 18, has one end passed through a hole 20 in the sheet 14 and is secured to the terminal 10. In FIG. 4 the wire 16 emerging from the hole 20 is guided into the inner end of a spiral groove 22 which is formed in the upper surface of the sheet 14. The sheet 14 is rotated so as to cause the wire 16 progressively to enter the groove 22. As shown in FIG. 5, the side walls of the groove 22 have a height greater than the diameter of the wire 16 thereby ensuring that the groove walls 24 project above the wire 16 in the groove. An electrical heating tool 26 is applied to each part of the groove 22 as soon as the wire 16 is located in that groove part thereby causing the adjacent groove walls 24 to heat up and become molten at their upper regions. These molten upper regions of the groove walls collapse inwardly onto the wire 16 therebetween, and these walls 24 solidify in that position after they emerge from the heating tool 26 so as to envelope and retain the wire 16 in the groove. It will be appreciated from FIG. 4 that by rotating the disc-like sheet 14 for a sufficient number of revolutions and causing the heating tool 26 to travel outwardly from the inner to the outer end of the groove 22, then the wire 16 is retained in the entire length of the groove 22. The wire 16 is then fed through a notch 28 in the outer periphery of the sheet 14 and secured to the terminal 12.

Figure 7:
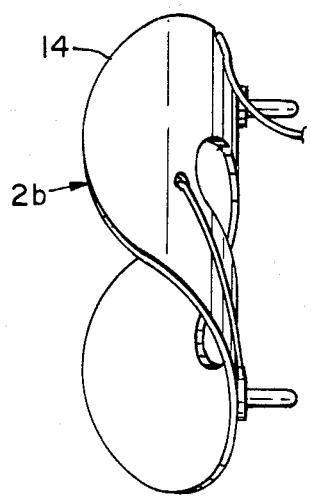
FIG. 7 is a perspective view of the shaped curved fusion pad for location in a moulding machine to form the tapping saddle.
Figure 2:
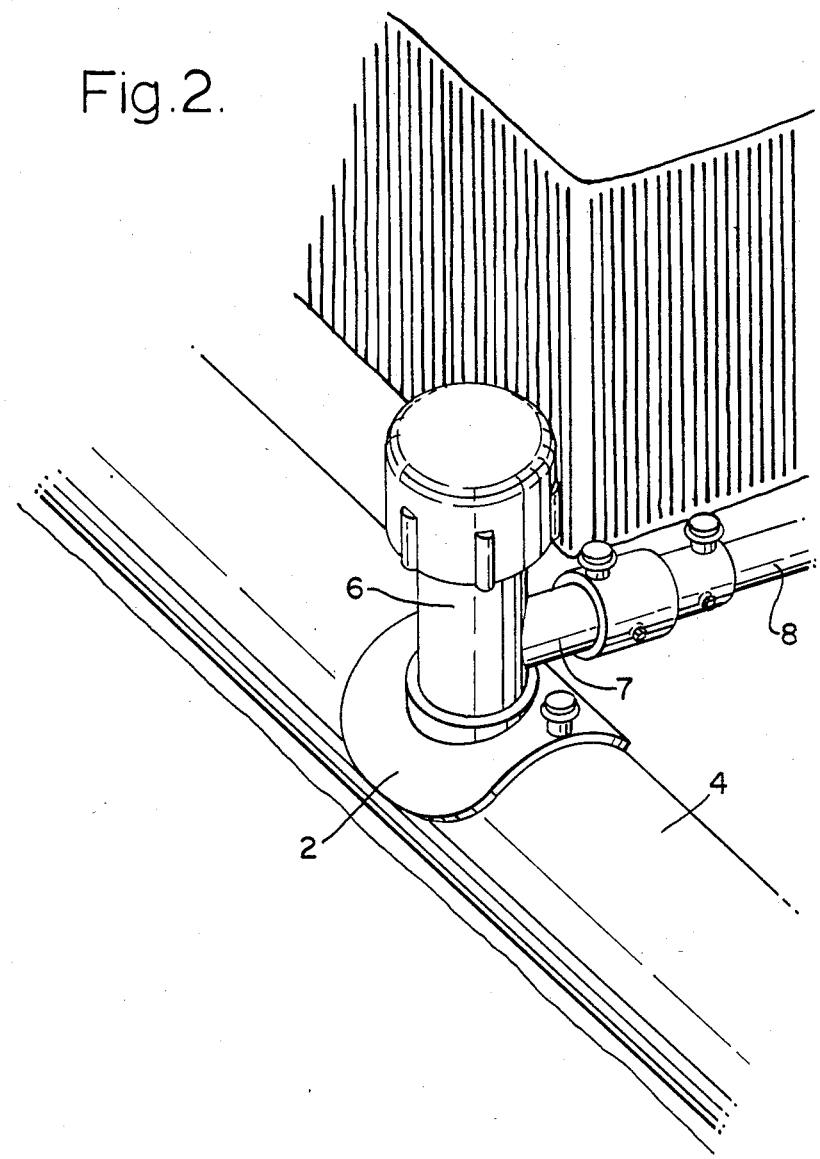

The fusion pad is then located on the forming surface of a tool base 30, and a punch 32 is pressed onto the tool base 30 to shape the fusion pad 2b into required saddle or curvature as illustrated in FIG. 7. Because of the previously described technique of retaining the wire 16 in the groove 22, this curving of the fusion pad does not cause the wire 16 to come out of the groove 22.

Figure 1:
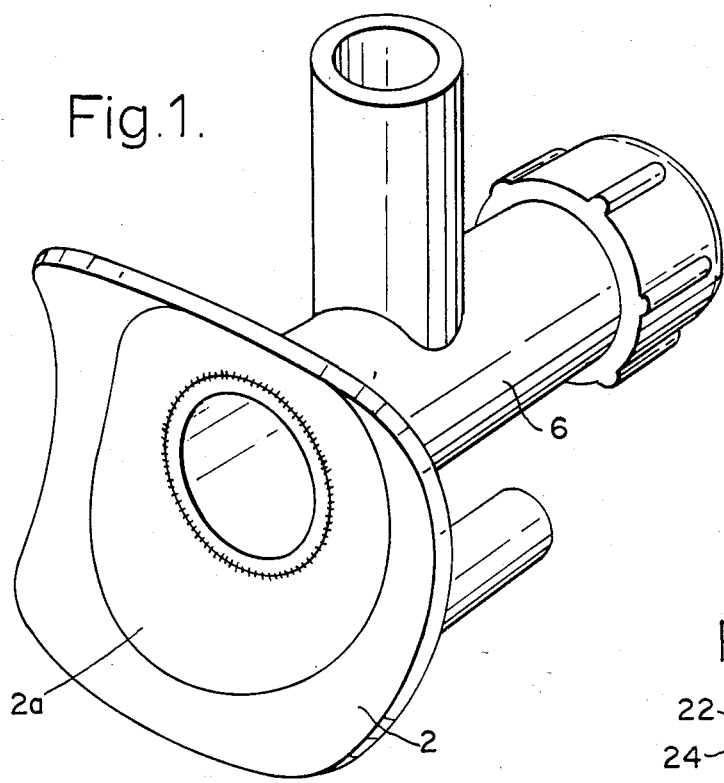
FIGS. 1 and 2 are described in the Background Art.
Figure 8:
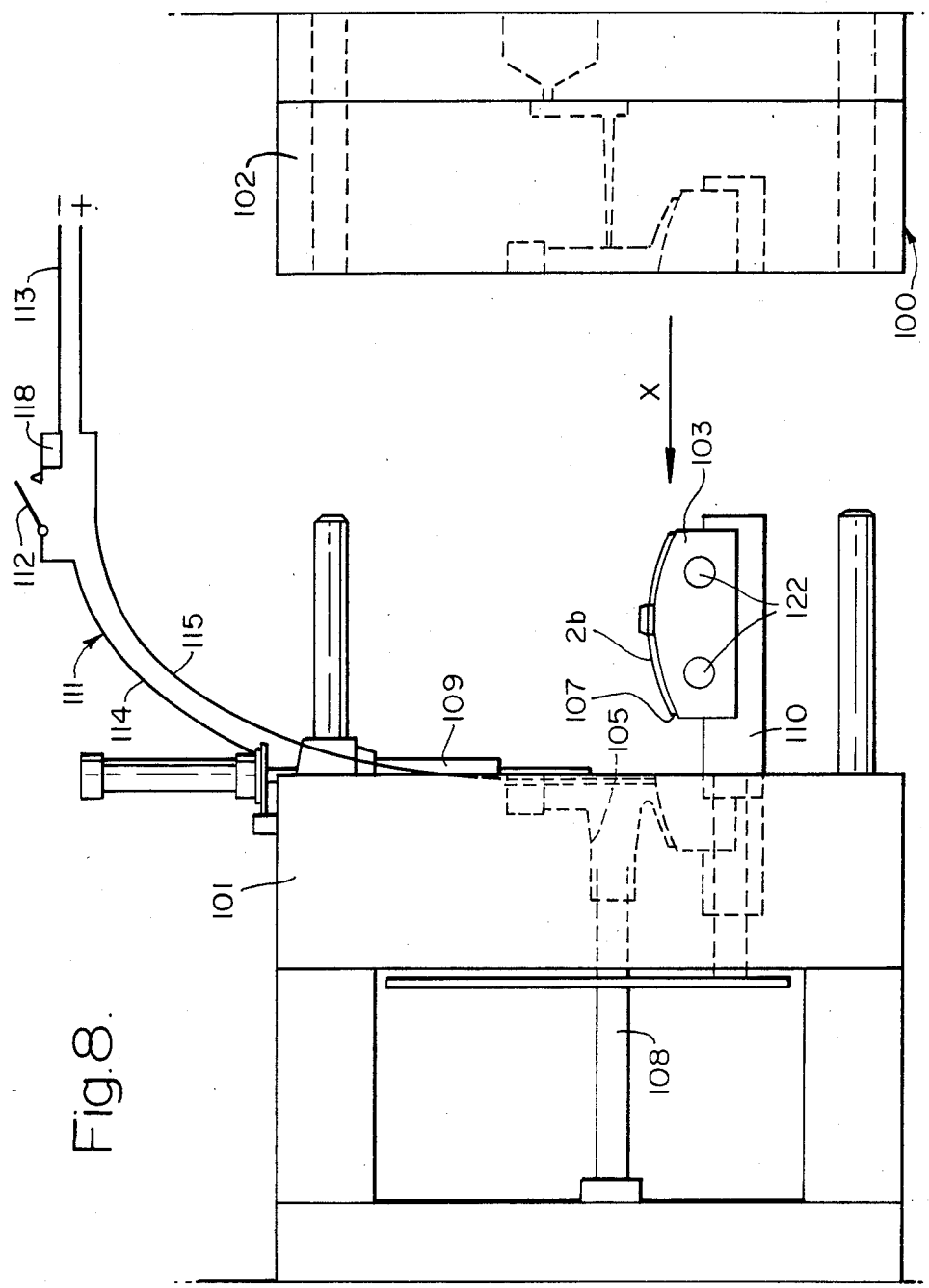
FIG. 8 is a side view of a moulding tool of an injection moulding machine for moulding the tapping saddle to the fusion pad, the tool being shown in an open condition.
Figure 10:
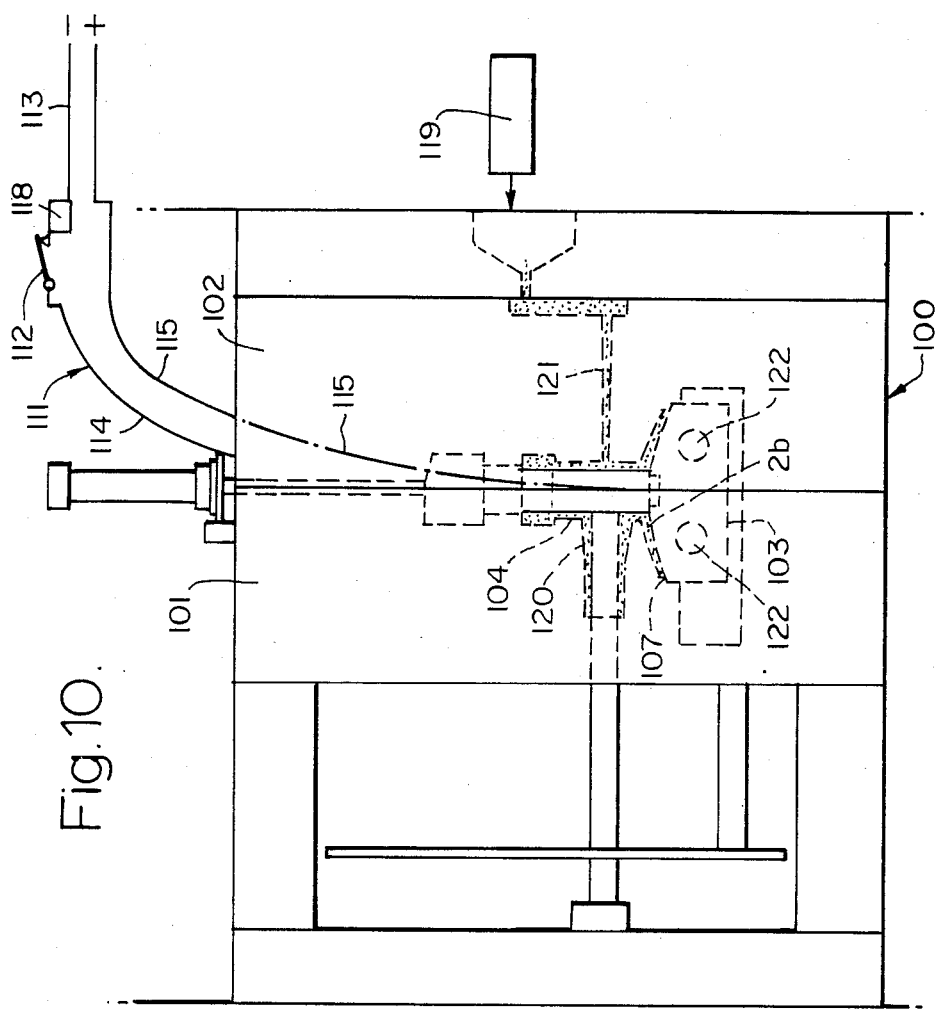
FIG. 10 shows the moulding tool of FIG. 8 in a closed condition for moulding the tapping saddle as an assembly with a fusion pad.

The fusion pad 2b as shown in FIG. 7 is now assembled as part of a tapping saddle by moulding it into a thermoplastics body to provide a structure which may be regarded as similar to that shown in FIG. 1 with the pad 2b corresponding to the pad part 2a. This assembly is achieved by use of an injection moulding machine having a split cavity moulding tool 100 (FIGS. 8 and 10) with die parts 101, 102 and a base part 103. The moulding tool 100 when closed for injection moulding (as shown in FIG. 10) has a moulding cavity 104 which substantially corresponds to the profile of the tapping saddle shown in FIG. 1 and, in conventional manner, retractable rods 108, 109 are provided in the tool which correspond to required bores which are to be formed in the saddle. As will be seen from FIG. 8, the cavity 104 in the mould when closed is defined by appropriately shaped recesses 105, 106 in the die parts and a convex surface 107 on the base part 3. The convex surface 107 corresponds to the concave profile of the fusion pad 2b and such a pad 2b is mounted in the tool with its concave surface in face-to-face contact with the surface 107 as shown in FIG. 8. For convenience of effecting such mounting the base part 103 is carried by a linkage 110 which extends when the tool 100 is opened to locate the base part 103 clear of the two die parts and retracts as the die parts are closed to define the cavity 104—this linkage 110 also serves as an ejector for convenience of removing the moulded tapping saddle from the moulding tool.

Figure 9:
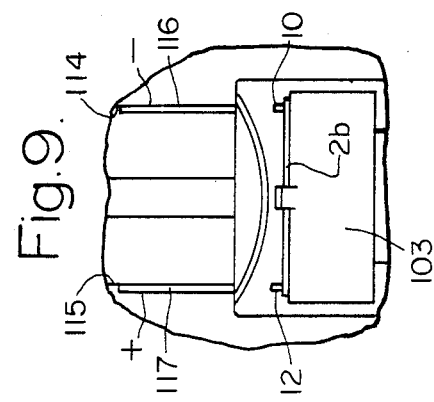
FIG. 9 is an end view of part of the tool shown in FIG. 8 as seen in the direction of arrow X.

Associated with the moulding tool 100 is an electrical control system 111 having an on/off control switch 112 for a power supply 113 for electrically heating the wire element 16 in the fusion pad 2b. The system 111 includes electrical conduits 114 and 115 which extend through passages in the moulding tool to communicate with terminals 116 and 117 respectively. The terminals 116 and 117 are displaceable in the moulding tool and are located to correspond (see FIG. 9) with the terminals 10 and 12 respectively of the fusion pad 2b which is mounted on the base part 103. Displacement of the terminals 116 and 117 is conveniently achieved by their movement in unison with the rod 109 so that, as the moulding tool is closed, the terminals 116 and 117 are automatically moved into electrical engagement with the respective terminals 10 and 12 and an electrical connection is thereby provided between the wire heating element and the system 111. The system 111 conveniently includes a timer device 118 which is actuated on closing the switch 112 to electrically heat the wire element 16 for a predetermined period.

On moulding the tapping saddle the tool 100 is closed around a fusion pad 2b mounted on the base part 103 to effect the electrical connection between the terminals 10 and 12 and the electrical system 111 and the switch 112 is closed to electrically heat the wire element 16 in the fusion pad. The cavity 104 is charged with thermoplastics in conventional manner from an injector device 119 of the machine to mould the body 120 over the fusion pad 2b as shown in FIG. 10 during which a removable sprue 121 is formed.

During this moulding process the electrical heating by the wire element of the plastics envelope 14 of the fusion pad promotes the bonding of the injected thermoplastics material for the body 120 to that of the envelope. Most known thermoplastics are suitable for producing the envelope of the fusion pad and the body of the tapping saddle provided that these plastics are compatible for bonding together as aforementioned; a preferred thermoplastics is medium or high density polyethylene and for this the saddle body 120 is moulded in a temperature range of approximately 200° C. to 250° C. To achieve an effective bond at the interface between the fusion pad envelope and the injected thermoplastics for the saddle body it is preferred that the surface of the envelope which bonds to the injected plastics is molten as a result of the heating effect from the wire element 16. However, it is also preferred that the concave surface of the envelope which is in face-to-face contact with the base part 103 of the moulding tool is maintained solid (or substantially so). The reason for this is that the wire element 16 will usually be located relatively near to the concave surface of the fusion pad 2b (to ensure that there will be an adequate transfer of heat from the fusion pad to a pipe surface to which the moulded saddle will ultimately be welded) and, by locating the wire element 16 in a region of the thermoplastics envelope 14 which is maintained relatively solid during injection moulding of the saddle body 120, it is possible to alleviate disturbance of the position of the wire element 16 in the fusion pad during the moulding process. It is therefore preferred that the base part 103 includes temperature control means such as passages 122 through which fluid, typically water, can flow for the purpose of heating or cooling that base part and thereby maintaining its surface 107 at a temperature consistent with the concave surface of the fusion pad being maintained solid during the moulding process. With polyethylene the temperature of the surface 107 will usually be maintained at less than 130° C. It will be appreciated from the aforegoing that by appropriate temperature control of the base part 103 and heating of the wire element in the fusion pad the thermoplastics envelope can be subjected to a temperature gradient providing a solid state at its interface with the base part and a molten state at its interface with the injected thermoplastics. The fusion pad envelope 14, typically, will have a thickness in the range of 0.5 millimetres to 2.0 millimetres and applying the moulding characteristics as aforementioned to such a pad, efficient fusing or bonding of the fusion pad to the injection moulded saddle body has been achieved with a current of approximately 5 amps being passed through the heating element 16 for approximately 45 to 50 seconds.

It has previously been proposed to injection mould a tapping saddle to a fusion pad part in a moulding machine similar to that generally discussed above but without the controlled heating of the fusion pad in accordance with the present invention. However, with these prior proposals there was a tendency for the fusion pad to come away from the injection moulded body of the saddle during welding of the saddle to a pipe wall and it is believed that the bonding which can be achieved with the present invention will alleviate this problem. It will be realised that although the preferred embodiment as above described and illustrated is for a tapping saddle, the invention can be applied to a pipe coupling in which case an appropriate moulding tool is provided having a cavity corresponding to the external profile of the coupling which is to be injection moulded while the bore of the coupling may be defined by a cylindrical rod core which extends through the cavity and on which is mounted a tubular fusion pad so that terminals on the fusion pad element contact with an electrical control system similar to that previously discussed. The rod core is preferably temperature controlled in a similar manner to the base part 103 and for a similar purpose.

We claim:

1. A method of moulding a thermosplastics member to a fusion pad, said pad comprising an electrically heatable element enveloped in a thermoplastics material, said method comprising mounting the fusion pad in a mould in a plastics moulding machine; moulding the thermoplastics member over the fusion pad and, during the moulding of the thermoplastics member electrically heating the element to assist in bonding the thermoplastics material of the envelope to the material of the member.

2. A method as claimed in claim which comprises mounting the fusion pad in the moulding machine with a surface part of the envelope communicating with a wall part of a base of the machine, said surface part corresponding to that part of the fusion pad which is to be welded to a surface of compatible thermoplastics material, and controlling the temperature of the wall part during the moulding of the thermoplastics member and electrical heating of the element to maintain said surface part of the envelope substantially solid.

3. A method as claimed in claim 2 which comprises controlling the temperature of the wall part and electrical heating of the element to provide a temperature gradient through the thermoplastics of the envelope for said thermoplastics of the envelope to be molten at the surface which bonds to the member.

4. A method as claimed in claim 2 which comprises mounting the fusion pad with its said surface part in face-to-face contact with the wall part of the base of the machine.

5. A method as claimed in claim 2 in which said surface part of the envelope is maintained at a temperature less than substantially 130° C. during moulding of the thermoplastics member.

6. A method as claimed in claim 1 in which the thermoplastics member is moulded at a temperature in excess of 130° C.

7. A method as claimed in claim 1 which comprises electrically heating the element by a current of substantially 5 amps for a period in the range of 45 to 60 seconds during moulding of the thermoplastics member.

8. A method as claimed in claim 1 in which the thermoplastics of the member and of the envelope is polyethylene.

9. A method as claimed in claim 1 in which the fusion pad is at least partially tubular and which comprises moulding the thermoplastics member over the fusion pad to form a pipe coupling.

10. A method as claimed in claim 1 in which the fusion pad is substantially saddle shaped and which comprises moulding the thermoplastics member over the fusion pad to form a pipe connecting saddle.

* * * * *